United States Patent [19]

Cherukuri et al.

[11] Patent Number: 4,980,178
[45] Date of Patent: Dec. 25, 1990

[54] REDUCED CALORIE CENTER-FILLED CHEWING GUM COMPOSITIONS HAVING IMPROVED STABILITY

[75] Inventors: Subraman R. Cherukuri, Towaco; Steven M. Faust, Stanhope, both of N.J.; Kenneth P. Bilka, Floral Park, N.Y.

[73] Assignee: Warner-Lambert Company, Morris Plains, N.J.

[21] Appl. No.: 376,945

[22] Filed: Jul. 7, 1989

Related U.S. Application Data

[63] Continuation-in-part of Ser. No. 939,918, Dec. 10, 1986, Pat. No. 4,872,884.

[51] Int. Cl.$^5$ .............................................. A23G 3/30
[52] U.S. Cl. ....................................... 426/5; 426/548; 426/804
[58] Field of Search .......................... 426/3–6, 426/548, 804

[56] References Cited

U.S. PATENT DOCUMENTS

| | | | |
|---|---|---|---|
| 3,894,154 | 7/1975 | Graff et al. | 426/5 |
| 4,156,740 | 5/1979 | Glass et al. | 426/3 |
| 4,157,402 | 6/1979 | Ogawa et al. | 426/5 |
| 4,316,915 | 2/1982 | Friello et al. | 426/5 |
| 4,357,354 | 11/1982 | Kehoe et al. | 426/3 |
| 4,357,355 | 11/1982 | Koch | 426/4 |
| 4,387,108 | 6/1983 | Koch et al. | 426/4 |
| 4,452,820 | 6/1984 | D'Amelia | 426/3 |
| 4,466,983 | 8/1984 | Cifresse et al. | 426/5 |
| 4,518,615 | 5/1985 | Cherukuri et al. | 426/4 |
| 4,698,223 | 10/1987 | Perfetti et al. | 426/6 |

Primary Examiner—Jeanette Hunter
Attorney, Agent, or Firm—Daniel A. Scola, Jr.; Craig M. Bell

[57] ABSTRACT

The present invention pertains to a center-filled chewing gum composition having an outer shell enclosing a cavity and a liquid center within the cavity, wherein the outer shell comprises a gum base having an enhanced hydrophilic nature. In a preferred embodiment invention pertains to a center-filled chewing gum composition wherein the outer shell comprises a gum base comprising in percentages by weight of the gum base (a) an elastomer present in an amount from about 0.5% to about 20%, (b) a medium molecular weight polyvinyl acetate polymer having a molecular weight from about 35,000 to about 55,000 present in an amount from about 10% to about 25%, (c) an acetylated monoglyceride present in an amount from about 4.5% to about 10%, (d) a wax having a melting point below about 60° C. present in an amount from about 6% to about 10%, and (e) a component selected from the group consisting of elastomer solvents, emulsifiers, plasticizers, fillers, and mixtures thereof, present in an amount to bring the total amount of gum base to 100%. The center-filled chewing gum compositions may be used with a wide variety of liquid centers. The present invention also pertains to methods for preparing the center-filled chewing gum compositions.

50 Claims, 1 Drawing Sheet

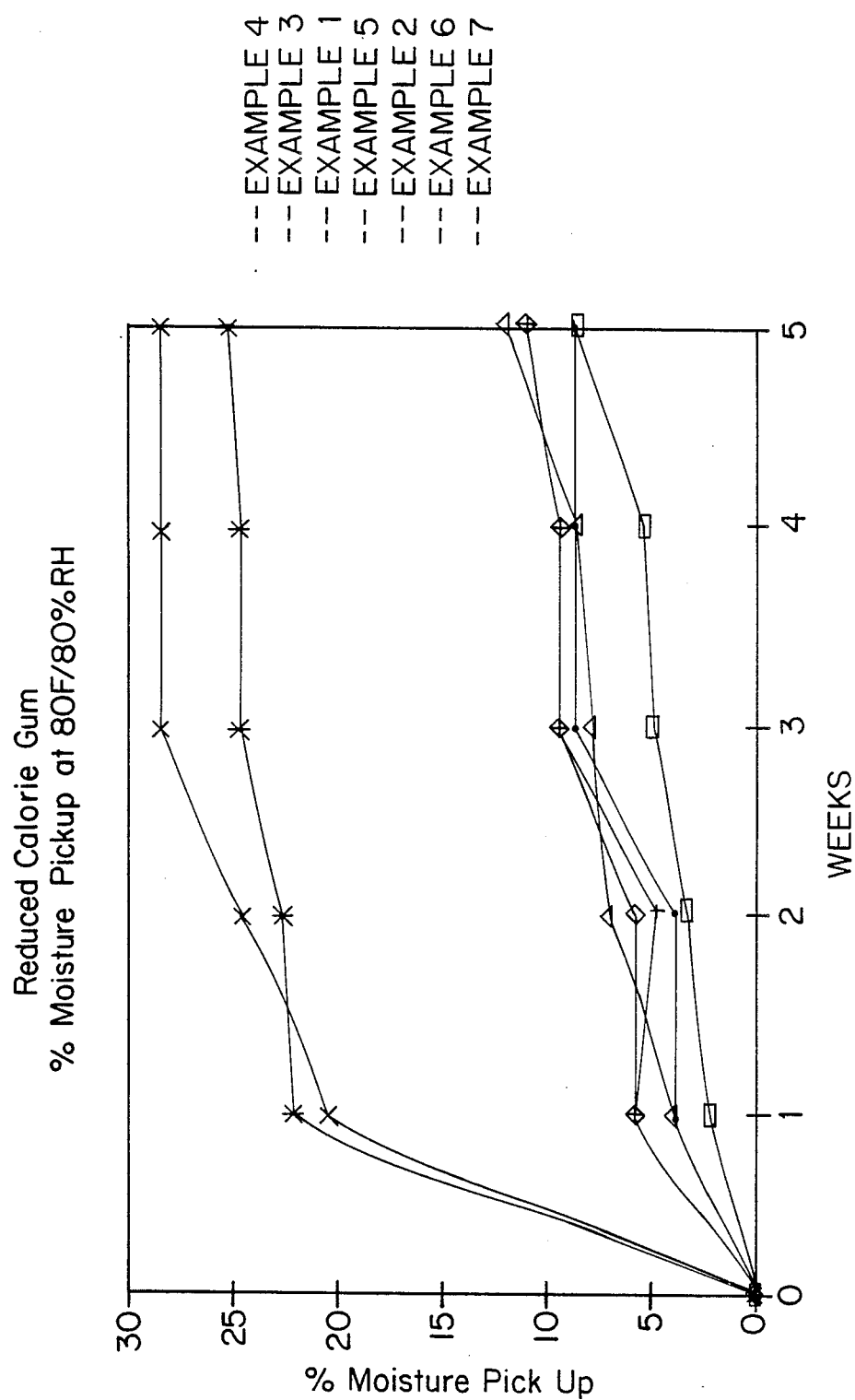

REDUCED CALORIE CENTER-FILLED CHEWING GUM COMPOSITIONS HAVING IMPROVED STABILITY

BACKGROUND OF THE INVENTION

This application is a continuation-in-part of application Ser. No. 939,918, filed Dec. 10, 1986 now U.S. Pat. No. 4,872,884.

FIELD OF THE INVENTION

This invention pertains to a center-filled chewing gum composition having improved stability. More particularly, this invention pertains to a chewing gum having an improved outer shell enclosing a cavity and a liquid center-fill within the cavity, wherein the outer shell comprises a high gum base composition having an enhanced hydrophilic nature. The improved outer shell of the center-filled chewing gum compositions may be used with a wide variety of liquid center-fills to help retain the fluid in the cavity. The present invention also pertains to methods for preparing the improved center-filled chewing gum compositions.

DESCRIPTION OF THE PRIOR ART

Center-filled chewing gum compositions are well known in the art. In general, such gums consist of an outer shell having a chewing gum composition enclosing a cavity containing a liquid center-fill which contains various additives such as flavoring agents, sweetening agents, and the like.

Maintaining the integrity of the liquid center and solid outer shell is a frequently encountered problem with center-filled chewing gum compositions during storage. One stability problem with center-filled chewing gum compositions is that on storage the liquid center tends to be absorbed by, or migrates into, the solid outer shell which results in a gum composition which has a softer outer shell and a reduced liquid center. A stability second problem with center-filled chewing gum compositions is that on storage ambient moisture is absorbed into the outer shell causing the outer shell to soften. Attempts to improve the storage stability of center-filled chewing gums have focused mainly on modifying the composition, and minimizing the aqueous content, of the liquid center to retard migration and absorption of the liquid into the outer shell. In general, only small amounts of a liquid center (up to about 20% by weight) have been incorporated into center-filled chewing gums.

U.S. Pat. No. 3,894,154, issued to Graff et al. and assigned to Warner-Lambert Company, discloses a center-filled chewing gum which contains an aqueous liquid center containing a water-miscible humectant such as glycerin to reduce the moisture content of the center and to thereby retard an increase in viscosity of the liquid center.

U.S. Pat. No. 4,156,740, issued to Glass et al. and assigned to Warner-Lambert Company, discloses a sugarless center-filled chewing gum which contains an aqueous liquid center containing a natural or synthetic gum such as carboxymethyl cellulose to bind the water in the liquid center.

U.S. Pat. No. 4,157,402, issued to Ogawa et al. and assigned to Lotte Co., Ltd., discloses a center-filled chewing gum which contains an aqueous liquid center containing an emulsifier to bind the flavor oils and water thereby reducing separation and migration of the center.

U.S. Pat. No. 4,316,915, issued to Friello et al. and assigned to Life Savers, Inc., discloses a center-filled chewing gum which contains a liquid center containing a thickener such as carboxymethyl cellulose in substantially all glycerin to retard migration of the liquid center into the outer shell.

U.S. Pat. No. 4,466,983, issued to Cifrese et al. and assigned to Warner-Lambert Company, discloses a center-filled chewing gum which contains a liquid center containing a mixture of hydrogenated starch hydrolysates, sorbitol solution, glycerin and optionally a flavoring agent, wherein the total water content of the liquid center is about 5% or less.

U.S. Pat. No. 4,698,223, issued to Perfetti et al. and assigned to Gum Base Co., SPA, discloses a no-calorie chewing gum composition which comprises from 92% to 99% of a gum base, up to 4% of glycerol, and up to 3% of a flavoring agent. The gum base comprises from 8% to 15% of an elastomer, from 10% to 30% of a hydrogenated or partially hydrogenated animal or vegetable oil, from 10% to 39% of an inert mineral filler, from 8% to 25% of polyvinyl acetate, from 4% to 9% of fatty acid glycerides, from 15% to 25% of resins, from 2% to 6% of natural gum, from 4% to 12% of wax and up to 0.05% of antioxidants.

While the above center-filled chewing gum compositions provide gums having improved stability during storage, none of the above compositions provides a center-filled gum composition which can accommodate a wide variety of liquid center compositions. Accordingly, it would be commercially advantageous to provide a center-filled chewing gum which can be used with a variety of liquid centers, which can encapsulate a substantially all aqueous liquid center, and which can accommodate a liquid center in an amount above 20%. The present invention provides such an improved center-filled chewing gum product without the disadvantages characteristic of previously known products. In particular, the present invention provides a center-filled chewing gum composition containing a high gum base outer shell which may be used with a wide variety of liquid center-fills to help retain the fluid in the cavity and prevent the liquid from being absorbed into the outer shell. The present invention also pertains to methods for preparing the improved center-filled chewing gum compositions.

SUMMARY OF THE INVENTION

The present invention pertains to a center-filled chewing gum composition having an outer shell enclosing a cavity and a liquid center within the cavity, wherein the outer shell comprises a gum base having an enhanced hydrophilic nature. In a preferred embodiment the invention pertains to a center-filled chewing gum composition wherein the outer shell comprises a gum base comprising in percentages by weight of the gum base (a) an elastomer present in an amount from about 0.5% to about 20%, (b) a medium molecular weight polyvinyl acetate polymer having a molecular weight from about 35,000 to about 55,000 present in an amount from about 10% to about 25%, (c) an acetylated monoglyceride present in an amount from about 4.5% to about 10%, (d) a wax having a melting point below about 60° C. present in an amount from about 6% to about 10%, and (e) a component selected from the group consisting of elastomer solvents, emulsifiers, plasticizers, fillers, and mixtures thereof, present in an amount to bring the total amount of gum base to 100%. The center-filled chewing gum compositions may be used with a wide variety of liquid centers. The present invention also pertains to methods for preparing the center-filled chewing gum compositions.

BRIEF DESCRIPTION OF THE DRAWING

FIG. 1 depicts in graphic format the moisture absorption, in percentage moisture absorbed by weight versus weeks of storage, of the chewing gum composition of examples 1–2 (controls) and examples 3–7 (test samples) at 27° C. and 80% R.H.

DETAILED DESCRIPTION OF THE INVENTION

The present invention pertains to a center-filled chewing gum composition having an outer shell enclosing a cavity and a liquid center within the cavity, wherein the outer shell comprises a gum base having an enhanced hydrophilic nature. In a preferred embodiment, the gum base comprises (a) an elastomer present in an amount from about 0.5% to about 20%, by weight of the gum base, (b) a medium molecular weight polyvinyl acetate polymer having a molecular weight from about 35,000 to about 55,000 present in an amount from about 10% to about 25%, by weight of the gum base, (c) an acetylated monoglyceride present in an amount from about 4.5% to about 10%, by weight of the gum base, (d) a wax having a melting point below about 60° C. present in an amount from about 6 to about 10%, by weight of the gum base, and (e) a component selected from the group consisting of elastomer solvents, emulsifiers, plasticizers, fillers, and mixtures thereof, present in an amount to bring the total amount of gum base to 100%, by weight of the gum base.

The present invention also pertains to a center-filled chewing gum composition wherein the outer shell comprises a chewing gum composition comprised of a high gum base-low bulking agent composition having increased hydrophobic properties. More particularly, the chewing gum composition comprises (A) a gum base present in an amount from about 40% to about 85%, by weight of the chewing gum composition, which comprises (a) an elastomer present in an amount from about 0.5% to about 20%, by weight of the gum base (b) a medium molecular weight polyvinyl acetate polymer having a molecular weight from about 35,000 to about 55,000 present in an amount from about 10% to about 25%, by weight of the gum base (c) an acetylated monoglyceride present in an amount from about 4.5% to about 10%, by weight of the gum base (d) a wax having a melting point below about 60° C. present in an amount from about 6 to about 10%, by weight of the gum base, and (e) a component selected from the group consisting of elastomer solvents, emulsifiers, plasticizers, fillers, and mixtures thereof, present in an amount to bring the total amount of gum base to 100%, by weight of the gum base, and (B) a bulking agent present in an up to about 60%, by weight of the chewing gum composition.

As used herein, the term "reduced-calorie composition" means a composition having a caloric value two thirds or less than that of a conventional composition. The term "tight" or "rubbery" chew refers to a chewing gum composition which requires a large amount of muscular chewing effort to masticate or to a composition which provides a gum bolus with high elasticity and bounce and which is difficult to deform.

Applicants have discovered a gum base containing a low melting point wax which does not require a high level of bulking agent to plasticize the gum base and render it soft during chewing. The novel gum base may be used at higher than normal levels in chewing gum compositions in place of a bulking and/or a sweetening agent to prepare high base-low bulking agent reduced-calorie gums which do not have rubbery or tight chew characteristics. The improved gum base possesses increased hydrophilic properties over conventional gum bases and appears to increase in size during chewing releasing flavoring and sweetening agents which would normally be entrapped in the gum base while maintaining a soft chew texture.

Applicants have also discovered that center-filled chewing gum compositions employing a gum base having an enhanced hydrophilic nature such as the inventive gum base, either alone or in a high gum base-low bulking agent gum composition, in the outer shell show greatly improved stability during storage. While the invention is not to be limited to theoretical considerations, applicants believe that outer shells comprising a gum base having an enhanced hydrophilic nature have increased hydrophobic character which resist absorption of the liquid center into the outer shell. At the same time, the hydrophobic film, which is low in bulking agent (carbohydrate) content, prevents ambient moisture from being absorbed by the outer shell and the liquid center causing the center to crystallize. Center-filled chewing gum compositions prepared with the high base-low bulking agent outer shell composition are less hygroscopic (have lower moisture-pickup) and are less prone to becoming stale than conventional center-filled gum compositions while having comparable firmness and texture. Moreover, significantly greater amounts of liquid centers, as well as liquid centers containing greater amounts of water, may be formulated in the center-filled gum compositions.

The elastomers (rubbers) employed in the gum base of the present invention will vary greatly depending upon various factors such as the type of gum base desired, the consistency of gum composition desired and the other components used in the composition to make the final chewing gum product. The elastomer may be any water-insoluble polymer known in the art, and includes those gum polymers utilized for chewing gums and bubble gums. Illustrative examples of suitable polymers in gum bases include both natural and synthetic elastomers. For example, those polymers which are suitable in gum base compositions include, without limitation, natural substances (of vegetable origin) such as chicle, natural rubber, crown gum, nispero, rosidinha, jelutong, perillo, niger gutta, tunu, balata, guttapercha, lechi capsi, sorva, gutta kay, and the like, and mixtures thereof. Examples of synthetic elastomers include, without limitation, styrene-butadiene copolymers (SBR), polyisobutylene, isobutylene-isoprene copolymers, polyethylene, and the like, and mixtures thereof.

The amount of elastomer employed in the gum base will vary greatly depending upon various factors such as the type of gum base used, the consistency of the gum composition desired and the other components used in the composition to make the final chewing gum product. In general, the elastomer will be present in the gum base in an amount from about 0.5% to about 20%, and preferably from about 2.5% to about 15%, by weight of the gum base.

The polyvinyl acetate polymer employed in the gum base of the present invention is a polyvinyl acetate polymer having a medium molecular weight, specifically, having a mean average molecular weight in the range from about 35,000 to about 55,000. This medium molecular weight polyvinyl acetate polymer will preferably have a viscosity from about 35 seconds to about 55 seconds (ASTM designation D1200-82 using a Ford cup viscometer procedure). The medium molecular weight polyvinyl acetate polymer will be present in the gum base in an amount from about 10% to about 25%, and preferably from about 12% to about 27%, by weight of the gum base.

The medium molecular weight polyvinyl acetate polymer may also be blended with a low molecular weight polyvinyl acetate polymer. The low molecular weight polyvinyl acetate polymer will have a mean average molecular weight in the range from about 12,000 to about 16,000. This low molecular weight polyvinyl acetate polymer will preferably have a viscosity from about 14 seconds to about 16 seconds (ASTM designation D1200-82 using a Ford cup viscometer procedure). The low molecular weight polyvinyl acetate polymer will be present in the gum base in an amount up about 17%, and preferably from about 12% to about 17%, by weight of the gum base.

When a low molecular weight polyvinyl acetate polymer is blended with a medium molecular weight polyvinyl acetate polymer, the polymers will be present in a mole ratio from about 1:0.5 to about 1:1.5, respectively.

The medium molecular weight polyvinyl acetate polymer may also be blended with a high molecular weight polyvinyl acetate polymer. The high molecular weight polyvinyl acetate polymer will have a mean average molecular weight in the range from about 65,000 to about 95,000. The high molecular weight polyvinyl acetate polymer will be present in the gum base in an amount up to about 5%, by weight of the gum base.

The acetylated monoglycerides in the present invention, like the polyvinyl acetate polymer, serve as plasticizing agents. While the saponification value of the acetylated monoglycerides is not critical, preferable saponification values are 278 to 292, 316 to 331, 370 to 380, and 430 to 470. A particularly preferred acetylated monoglyceride has a saponification value above about 400. Such acetylated monoglycerides generally have an acetylation value (percentage acetylated) above about 90 and a hydroxyl value below about 10 (Food Chemical Codex (FCC) III/P508 and the revision of AOCS).

The use of acetylated monoglycerides in the present gum base is preferred over the use of bitter polyvinyl acetate (PVA) plasticizers, in particular, triacetin. The acetylated monoglycerides will be present in the gum base in an amount from about 4.5% to about 10%, and preferably from about 5% to about 9%, by weight of the gum base.

The wax in the gum base of the present invention softens the polymeric elastomer mixture and improves the elasticity of the gum base. The waxes employed will have a melting point below about 60° C., and preferably between about 45° C. and about 55° C. A preferred wax is low melting paraffin wax. The wax will be present in the gum base in an amount from about 6% to about 10%, and preferably from about 7% to about 9.5%, by weight of the gum base.

In addition to the low melting point waxes, waxes having a higher melting point may be used in the gum base in amounts up to about 5%, by weight of the gum base. Such high melting waxes include beeswax, vegetable wax, candelilla wax, carnuba wax, most petroleum waxes, and the like, and mixtures thereof.

In addition to the components set out above, the gum base includes a variety of traditional ingredients, such as a component selected from the group consisting of elastomer solvents, emulsifiers, plasticizers, fillers, and mixtures thereof. These ingredients are present in the gum base in an amount to bring the total amount of gum base to 100%.

The gum base may contain elastomer solvents to aid in softening the elastomer component. Such elastomer solvents may comprise those elastomer solvents known in the art, for example, terpinene resins such as polymers of alpha-pinene or beta-pinene, methyl, glycerol and pentaerythritol esters of rosins and modified rosins and gums such as hydrogenated, dimerized and polymerized rosins, and mixtures thereof. Examples of elastomer solvents suitable for use herein include the pentaerythritol ester of partially hydrogenated wood and gum rosin, the pentaerythritol ester of wood and gum rosin, the glycerol ester of wood rosin, the glycerol ester of partially dimerized wood and gum rosin, the glycerol ester of polymerized wood and gum rosin, the glycerol ester of tall oil rosin, the glycerol ester of wood and gum rosin and the partially hydrogenated wood and gum rosin and the partially hydrogenated methyl ester of wood and rosin, and the like, and mixtures thereof. The elastomer solvent may be employed in the gum base in amounts from about 2% to about 15%, and preferably from about 7% to about 11%, by weight of the gum base.

The gum base may also include emulsifiers which aid in dispersing the immiscible components into a single stable system. The emulsifiers useful in this invention include glyceryl monostearate, lecithin, fatty acid monoglycerides, diglycerides, propylene glycol monostearate, and the like, and mixtures thereof. A preferred emulsifier is glyceryl monostearate. The emulsifier may be employed in amounts from about 2% to about 15%, and preferably from about 7% to about 11%, by weight of the gum base.

The gum base may also include plasticizers or softeners to provide a variety of desirable textures and consistency properties. Because of the low molecular weight of these ingredients, the plasticizers and softeners are able to penetrate the fundamental structure of the gum base making it plastic and less viscous. Useful plasticizers and softeners include lanolin, palmitic acid, oleic acid, stearic acid, sodium stearate, potassium stearate, glyceryl triacetate, glyceryl lecithin, glyceryl monostearate, propylene glycol monostearate, acetylated monoglyceride, glycerine, and the like, and mixtures thereof Waxes, for example, natural and synthetic waxes, hydrogenated vegetable oils, petroleum waxes such as polyurethane waxes, polyethylene waxes, paraffin waxes, microcrystalline waxes, fatty waxes, sorbitan monostearate, tallow, propylene glycol, mixtures thereof, and the like, may also be incorporated into the gum base. The plasticizers and softeners are generally employed in the gum base in amounts up to about 20%, and preferably in amounts from about 9% to about 17%, by weight of the gum base.

Preferred plasticizers are the hydrogenated vegetable oils and include soybean oil and cottonseed oil which may be employed alone or in combination. These plasticizers provide the gum base with good texture and soft chew characteristics. These plasticizers and softeners are generally employed in amounts from about 5% to about 14%, and preferably in amounts from about 5% to about 13.5%, by weight of the gum base.

In another preferred embodiment, the softening agent is anhydrous glycerin, such as the commercially available United States Pharmacopeia (USP) grade. Glycerin is a syrupy liquid with a sweet warm taste and has a sweetness of about 60% of that of cane sugar. Because glycerin is hygroscopic, it is important that the anhydrous glycerin be maintained under anhydrous conditions throughout the preparation of the chewing gum composition.

The gum base of this invention may also include effective amounts of bulking agents such as mineral adjuvants which may serve as fillers and textural agents. Useful mineral adjuvants include calcium carbonate, magnesium carbonate, alumina, aluminum hydroxide, aluminum silicate, talc, tricalcium phosphate, dicalcium phosphate, and the like, and mixtures thereof. These fillers or adjuvants may be used in the gum base compositions in various amounts. Preferably the amount of filler, when used, will be present in an amount from about 15% to about 40%, and preferably from about 20% to about 30%, by weight of the gum base.

A variety of traditional ingredients may be optionally included in the gum base in effective amounts such as coloring agents, antioxidants, preservatives, flavoring agents, and the like. For example, titanium dioxide and other dyes suitable for food, drug and cosmetic applications, known as F. D. & C. dyes, may be utilized. An anti-oxidant such as butylated hydroxytoluene (BHT), butylated hydroxyanisole (BHA), propyl gallate, and mixtures thereof, may also be included. Other conventional chewing gum additives known to one having ordinary skill in the chewing gum art may also be used in the gum base.

In a preferred embodiment, the invention is directed at a center-filled chewing gum composition having an outer shell enclosing a cavity and a liquid center within the cavity, wherein the outer shell comprises a gum base comprising in percentages by weight of the gum base (a) an elastomer present in an amount from about 0.5% to about 20%, (b) a medium molecular weight polyvinyl acetate polymer having a molecular weight from about 35,000 to about 55,000 present in an amount from about 10% to about 25%, (c) an acetylated monoglyceride present in an amount from about 4.5% to about 10%, (d) a wax having a melting point below about 60° C. present in an amount from about 6% to about 10%, (e) an elastomer solvent present in an amount from about 2% to about 11%, (f) a plasticizer in an amount from about 5% to about 14%, and (g) a filler in an amount from about 15% to about 40%.

The present invention extends to methods of making the improved gum base compositions. The manner in which the gum base components are admixed is not critical and is performed using standard techniques and apparatus known to those skilled in the art. In a typical method, an elastomer is admixed with an elastomer solvent and/or a plasticizer and/or an emulsifier and agitated for a period of from 1 to 30 minutes. After blending is complete, the polyvinyl acetate component is admixed into the mixture. The medium molecular weight polyvinyl acetate is preferably admixed prior to addition of the optional low molecular weight polyvinyl acetate to prevent the creation of pockets of polyvinyl acetate within the elastomer mixture. The remaining ingredients, such as the low melting point wax, are then admixed, either in bulk or incrementally, while the gum base mixture is blended again for 1 to 30 minutes.

In a preferred embodiment, the invention is directed to a method for preparing an outer shell in a center-filled chewing gum composition, wherein the outer shell is comprised of a gum base, which comprises the steps of (1) providing the following ingredients of the gum base in percentages by weight (a) an elastomer present in an amount from about 0.5% to about 20%, (b) a medium molecular weight polyvinyl acetate polymer having a molecular weight from about 35,000 to about 55,000 present in an amount from about 10% to about 25%, (c) an acetylated monoglyceride present in an amount from about 4.5% to about 10%, (d) a wax having a melting point below about 60° C. present in an amount from about 6 to about 10%, and (e) a component selected from the group consisting of elastomer solvents, emulsifiers, plasticizers, fillers, and mixtures thereof, present in an amount to bring the total amount of gum base to 100%, and (2) admixing the ingredients in step (1) to form a uniform mixture.

Once prepared, the inventive gum base having an enhanced hydrophilic nature may be used directly as the outer shell of a center-filled gum, may be formulated with conventional additives to prepare a wide variety of chewing gum compositions for use as the outer shell of a center-filled gum, or may be stored for future use. The gum base may be used in sugar and sugarless containing chewing gum products to prepare a reduced-calorie containing gum product.

Other gum bases having an enhanced hydrophilic nature and suitable for use in chewing gum compositions in higher than conventional amounts may also be employed in the present invention. In general, these gum bases may be employed in amounts up to 99%, preferably from about 40% to about 95%, and more preferably from about 40% to about 85%, by weight of the chewing gum composition. Suitable gum bases having an enhanced hydrophilic nature include, for example, those disclosed in U.S. Pat. No. 4,698,223, which disclosure is incorporated herein by reference. The gum base may be used directly as the outer shell of a center-filled gum or may be formulated with conventional additives to prepare a wide variety of chewing gum compositions for use as the outer shell of a center-filled gum.

In one embodiment of the invention, the gum base having an enhanced hydrophilic nature is used as the outer shell of a center-filled chewing gum. Sweetening agents, flavoring agents, and the like, as set out below, may be included in the center-filled portion of the gum.

In another embodiment of the invention, the gum base having an enhanced hydrophilic nature is formulated with additives such as a bulking agent, a sweetening agent, a flavoring agent, and the like, to form a chewing gum composition which is used as the outer shell of a center-filled chewing gum. Additional sweetening agents, flavoring agents, and the like, may be included in the center-filled portion of the chewing gum. The amount of gum base employed in the chewing gum composition will vary depending on such factors as the type of gum base used, the consistency desired, and the other components used to make the final chewing gum product. In general, the gum base will be present in the chewing gum composition in an amount from about 40% to about 85%, and preferably from about 50% to about 65%, by weight of the chewing gum composition.

The gum composition may include effective amounts of conventional additives selected from the group consisting of sweetening agents (sweeteners), plasticizers, softeners, emulsifiers, waxes, fillers, bulking agents (carriers, extenders), mineral adjuvants, flavoring agents (flavors, flavorings), coloring agents (colorants, colorings), antioxidants, acidulants, thickeners, and the like, and mixtures thereof. These ingredients are present in the chewing gum composition in an amount to bring the total amount of chewing gum composition to 100%. Some of these additives may serve more than one purpose. For example, in sugarless gum compositions, a sweetener, such as sorbitol or other sugar alcohol, may also function as a bulking agent.

The plasticizers, softening agents, mineral adjuvants, waxes and antioxidants discussed above, as being suitable for use in the gum base, may also be used in the chewing gum composition. Examples of other conventional additives which may be used include emulsifiers, such as lecithin and glyceryl monostearate, thickeners, used alone or in combination with other softeners, such as methyl cellulose, alginates, carrageenan, xanthan gum, gelatin, carob, tragacanth, locust bean, and carboxy methyl cellulose, acidulants such as malic acid, adipic acid, citric acid, tartaric acid, fumaric acid, and mixtures thereof, and fillers, such as those discussed above under the category of mineral adjuvants.

The chewing gum composition may also contain a bulking agent. Suitable bulking agents may be water-soluble and include sweetening agents selected from the group consisting of, but not limited to, monosaccharides, disaccharides, polysaccharides, sugar alcohols, and mixtures thereof; randomly bonded glucose polymers such as those polymers distributed under the tradename POLYDEXTROSE by Pfizer, Inc., Groton, Conn.; isomalt (a racemic mixture of alpha-D-glucopyranosyl-1,6-mannitol and alpha-D-glucopyranosyl-l,6-sorbitol manufactured under the tradename PALATINIT by Suddeutsche Zucker), maltodextrins; hydrogenated starch hydrolysates; hydrogenated hexoses; hydrogenated disaccharides; minerals, such as calcium carbonate, talc, titanium dioxide, dicalcium phosphate, celluloses and the and the like, and mixtures thereof. Bulking agents may be used in amounts up to about 60%, and preferably in amounts from about 15% to about 60%, by weight of the chewing gum composition.

Suitable sugar bulking agents include monosaccharides, disaccharides and polysaccharides such as xylose, ribulose, glucose (dextrose), mannose, galactose, fructose (levulose), sucrose (sugar), maltose, invert sugar, partially hydrolyzed starch and corn syrup solids, and mixtures thereof. Mixtures of sucrose and corn syrup solids are the preferred sugar bulking agents.

Suitable sugar alcohol bulking agents include sorbitol, xylitol, mannitol, galactitol, maltitol, and mixtures thereof. Mixtures of sorbitol and mannitol are the preferred sugar alcohol bulking agents.

Maltitol is a sweet, water-soluble sugar alcohol useful as a bulking agent in the preparation of beverages and foodstuffs and is more fully described in U.S. Pat. No. 3,708,396, which disclosure is incorporated herein by reference. Maltitol is made by hydrogenation of maltose which is the most common reducing disaccharide and is found in starch and other natural products.

Suitable hydrogenated starch hydrolysates include those disclosed in U.S. Pat. Nos. 25,959, 3,356,811, 4,279,931 and various hydrogenated glucose syrups and/or powders which contain sorbitol, hydrogenated disaccharides, hydrogenated higher polysaccharides, or mixtures thereof. Hydrogenated starch hydrolysates are primarily prepared by the controlled catalytic hydrogenation of corn syrups. The resulting hydrogenated starch hydrolysates are mixtures of monomeric, dimeric, and polymeric saccharides. The ratios of these different saccharides give different hydrogenated starch hydrolysates different properties. Mixtures of hydrogenated starch hydrolysates, such as LYCASIN, a commercially available product manufactured by Roquette Freres of France, and HYSTAR, a commercially available product manufactured by Lonza, Inc., of Fairlawn, N.J., are also useful.

The sweetening agents used may be selected from. a wide range of materials including water-soluble sweeteners, water-soluble artificial sweeteners, water-soluble sweeteners derived from naturally occurring water-soluble sweeteners, dipeptide based sweeteners, and protein based sweeteners, including mixtures thereof. Without being limited to particular sweeteners, representative categories and examples include:

(a) water-soluble sweetening agents such asdihydrochalcones, monellin, steviosides, glycyrrhizin, dihydroflavenol, and sugar alcohols such as sorbitol, mannitol, maltitol, and L-aminodicarboxylic acid aminoalkenoic acid ester amides, such as those disclosed in U.S. Pat. No. 4,619,834, which disclosure is incorporated herein by reference, and the like, and mixtures thereof;

(b) water-soluble artificial sweeteners such as soluble saccharin salts, i.e., sodium or calcium saccharin salts, cyclamate salts, the sodium, ammonium or calcium salt of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (Acesulfame-K), the free acid form of saccharin, and the like, and mixtures thereof;

(c) dipeptide based sweeteners, such as L-aspartic acid derived sweeteners, such as L-aspartyl-L-phenylalanine methyl ester (Aspartame) and materials described in U.S. Pat. No. 3,492,131, L-alphaaspartyl-N-(2,2,4,4-tetramethyl-3-thietanyl)-D-alaninamide hydrate (Alitame), methyl esters of L-aspartyl-L-phenylglycerine and L-aspartyl-L-2,5-dihydrophenyl-glycine, L-aspartyl-2,5-dihydro-L-phenylalanine; L-aspartyl-L-(1-cyclohexen)-alanine, and the like, and mixtures thereof;

(d) water-soluble sweeteners derived from naturally occurring water-soluble sweeteners, such as chlorinated derivatives of ordinary sugar (sucrose), e.g., chlorodeoxysugar derivatives such as derivatives of chlorodeoxysucrose or chlorodeoxygalactosucrose, known, for example, under the product designation of Sucralose; examples of chlorodeoxysucrose and chlorodeoxygalactosucrose derivatives include but are not limited to: 1-chloro-1'-deoxysucrose; 4-chloro-4-deoxy-alpha-D-galactopyranosyl-alpha-D-fructofuranoside, or 4-chloro-4deoxygalactosucrose; 4-chloro-4-deoxy-alpha-D-galactopyranosyl-1-chloro-l-deoxy-beta-D-fructo-furanoside, or 4,1'-dichloro-4,1'-dideoxygalactosucrose; 1',6'-dichloro-1',6'-dideoxysucrose; 4-chloro-4-deoxy-alpha-D-galactopyranosyl-1,6-dichloro-l,6-dideoxy-beta-D-fructofuranoside, or 4,1',6'-trichloro-4,1',6'-trideoxygalactosucrose; 4,6-dichloro-4,6-dideoxy-alpha-D-galactopyranosyl-6-chloro-6-deoxybeta-D-fructofuranoside, or 4,6,6'-trichloro-4,6,6'-trideoxygalactosucrose; 6,1',6'-trichloro-6,1',6'-trideoxysucrose; 4,6-dichloro-4,6-dideoxy-alpha-D-galactopyranosyl-1,6-dichloro-1,6-dideoxy-beta-D-fructofuranoside, or 4,6,1',6'-tetrachloro4,6,1',6'-tetradeoxygalacto-sucrose; and 4,6,1',6'-tetradeoxy-sucrose, and mixtures thereof; and (e) protein based sweeteners such as thaumaoccous danielli (Thaumatin I and II).

The intense sweetening agents of the present invention may be used in many distinct physical forms well known in the art to provide an initial burst of sweetness and/or a prolonged sensation of sweetness. Without being limited thereto, such physical forms include free forms, such as spray dried, powdered, and beaded forms, and encapsulated forms, and mixtures thereof.

In general, an effective amount of sweetener is utilized to provide the level of sweetness desired, and this amount will vary with the sweetener selected. The amount of sweetener will normally be present in amounts from about 0.001% to about 3%, by weight of the gum composition, depending upon the sweetener used. The exact range of amounts for each type of sweetener is well known in the art and is not the subject of the present invention.

The flavoring agents which may be used include those flavors known to the skilled artisan, such as natural and artificial flavors. These flavorings may be chosen from synthetic flavor oils and flavoring aromatics and/or oils, oleoresins and extracts derived from plants, leaves, flowers, fruits, and so forth, and combinations thereof. Nonlimiting representative flavor oils include spearmint oil, cinnamon oil, oil of wintergreen (methyl salicylate), peppermint oil, clove oil, bay oil, anise oil, eucalyptus oil, thyme oil, cedar leaf oil, oil of nutmeg, allspice, oil of sage, mace, oil of bitter almonds, and cassia oil. Also useful flavorings are artificial, natural and synthetic fruit flavors such as vanilla, and citrus oils including lemon, orange, lime, grapefruit, and fruit essences including apple, pear, peach, grape, strawberry, raspberry, cherry, plum, pineapple, apricot and so forth. These flavoring agents may be used in liquid or solid form and may be used individually or in admixture. Commonly used flavors include mints such as peppermint, menthol, artificial vanilla, cinnamon derivatives, and various fruit flavors, whether employed individually or in admixture.

Other useful flavorings include aldehydes and esters such as cinnamyl acetate, cinnamaldehyde, citral diethylacetal, dihydrocarvyl acetate, eugenyl formate, p-methylamisol, and so forth may be used. Generally any flavoring or food additive such as those described in Chemicals Used in Food Processing, publication 1274, pages 63-258, by the National Academy of Sciences, may be used.

Further examples of aldehyde flavorings include but are not limited to acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin), cherry, grape, strawberry shortcake, mixtures thereof and the like.

The flavoring agent may be employed in either liquid form and/or dried form. When employed in the latter form, suitable drying means such as spray drying the oil may be used. Alternatively, the flavoring agent may be absorbed onto water soluble materials, such as cellulose, starch, sugar, maltodextrin, gum arabic and so forth or may be encapsulated. The actual techniques for preparing such dried forms are well known and do not constitute a part of this invention.

The flavoring agents of the present invention may be used in many distinct physical forms well known in the art to provide an initial burst of flavor and/or a prolonged sensation of flavor. Without being limited thereto, such physical forms include free forms, such as spray dried, powdered, and beaded forms, and encapsulated forms, and mixtures thereof.

The amount of flavoring agent employed herein is normally a matter of preference subject to such factors as the type of final chewing gum composition, the individual flavor, the gum base employed, and the strength of flavor desired. Thus, the amount of flavoring may be varied in order to obtain the result desired in the final product and such variations are within the capabilities of those skilled in the art without the need for undue experimentation. In gum compositions, the flavoring agent is generally present in amounts from about 0.02% to about 5%, and preferably from about 0.1% to about 2%, and more preferably, from about 0.8% to about 1.8%, by weight of the chewing gum composition.

The coloring agents useful in the present invention are used in amounts effective to produce the desired color. These coloring agents include pigments which may be incorporated in amounts up to about 6%, by weight of the gum composition. A preferred pigment, titanium dioxide, may be incorporated in amounts up to about 2%, and preferably less than about 1%, by weight of the gum composition. The colorants may also include natural food colors and dyes suitable for food, drug and cosmetic applications. These colorants are known as F.D.& C. dyes and lakes. The materials acceptable for the foregoing uses are preferably water-soluble. Illustrative nonlimiting examples include the indigoid dye known as F.D.& C. Blue No.2, which is the disodium salt of 5,5-indigotindisulfonic acid. Similarly, the dye known as F.D.& C. Green No.1 comprises a triphenylmethane dye and is the monosodium salt of 4-[4-(N-ethyl-p-sulfoniumbenzylamino) diphenylmethylene]-[1-(N-ethyl -N-p-sulfoniumbenzyl)-delta-2,5-cyclohexadieneimine]. A full recitation of all F.D.& C. colorants and their corresponding chemical structures may be found in the Kirk-Othmer Encyclopedia of Chemical Technology, 3rd Edition, in volume 5 at pages 857-884, which text is incorporated herein by reference.

Suitable oils and fats usable in gum compositions include partially hydrogenated vegetable or animal fats, such as coconut oil, palm kernel oil, beef tallow, lard, and the like. These ingredients when used are generally present in amounts up to about 7%, and preferably up to about 3.5%, by weight of the gum composition.

In a preferred embodiment, the invention is directed at a center-filled chewing gum composition having an outer shell enclosing a cavity and a liquid center within the cavity, wherein the outer shell comprises a chewing gum composition comprising (A) a gum base present in an amount from about 40% to about 85%, by weight of the chewing gum composition, which comprises (a) an elastomer present in an amount from about 0.5% to about 20%, by weight of the gum base, (b) a medium molecular weight polyvinyl acetate polymer having a molecular weight from about 35,000 to about 55,000 present in an amount from about 10% to about 25%, by weight of the gum base, (c) an acetylated monoglyceride present in an amount from about 4.5% to about 10%, by weight of the gum base, (d) a wax having a melting point below about 60° C. present in an amount from about 6% to about 10%, by weight of the gum base, (e) an elastomer solvent present in an amount from about 2% to about 11%, by weight of the gum base, (f) a plasticizer in an amount from about 5% to about 14%, by weight of the gum base, and (g) a filler in an amount from about 15% to about 40%, by weight of the gum base, and (B) a bulking agent present in an amount up to about 60%, by weight of the chewing gum composition The present invention also includes a method for preparing the improved chewing gum compositions, including both chewing gum and bubble gum formulations. The chewing gum compositions may be prepared using standard techniques and equipment known to those skilled in the art. The apparatus useful in accordance with the present invention comprises mixing and heating apparatus well known in the chewing gum manufacturing arts, and therefore the selection of the specific apparatus will be apparent to the artisan In such a method, a chewing gum composition is made by admixing the inventive gum base with the other ingredients of the final desired chewing gum composition. Other ingredients will usually be incorporated into the composition as dictated by the nature of the desired composition as well known by those having ordinary skill in the art. The ultimate chewing gum compositions are readily prepared using methods generally known in the food technology and chewing gum arts.

For example, the inventive gum base is heated to a temperature sufficiently high to soften the base without adversely effecting the physical and chemical make up of the base. The optimal temperatures utilized may vary depending upon the composition of the gum base used, but such temperatures are readily determined by those skilled in the art without undue experimentation.

The gum base is conventionally melted at temperatures that range from about 60° C. to about 120° C. for a period of time sufficient to render the base molten. For example, the gum base may be heated under these conditions for a period of about thirty minutes just prior to being admixed incrementally with the remaining ingredients of the gum composition such as the plasticizer, the softener, the bulking agent, the sweetener, and/or fillers, coloring agents and flavoring agents to plasticize the blend as well as to modulate the hardness, viscoelasticity and formability of the base. Mixing is continued until a uniform mixture of gum composition is obtained Thereafter the gum composition mixture may be formed into desirable chewing gum shapes.

In one embodiment, the invention is directed at a method for preparing an outer shell in a center-filled chewing gum composition, wherein the outer shell is comprised of a gum base having an enhanced hydrophilic nature, which comprises the steps of (I) providing the ingredients of the gum base having an enhanced hydrophilic nature, and (2) admixing the ingredients in step (1) to form a uniform mixture.

In another embodiment, the invention is directed at a method for preparing an outer shell in a center-filled chewing gum composition, wherein the outer shell is comprised of a chewing gum composition, which comprises the steps of (1) providing the following ingredients of the chewing gum composition (A) a gum base having an enhanced hydrophilic nature present in an amount from about 40% to about 85%, by weight of the chewing gum composition, and (B) a bulking agent present in an amount up to about 60%, by weight of the chewing gum composition, (2) admixing the ingredients in step (A) to form a uniform mixture, and (3) admixing the ingredients in step (B) to the mixture of step (2) to form a uniform mixture.

In a preferred embodiment, the invention is directed to a method for preparing an outer shell in a center-filled chewing gum composition, wherein the outer shell is comprised of a gum base, which comprises the steps of (1) providing the following ingredients in percentages by weight of the gum base (a) an elastomer present in an amount from about 0.5% to about 20%, (b) a medium molecular weight polyvinyl acetate polymer having a molecular weight from about 35,000 to about 55,000 present in an amount from about 10% to about 25%, (c) an acetylated monoglyceride present in an amount from about 4.5% to about 10%, (d) a wax having a melting point below about 60° C. present in an amount from about 6% to about 10%, and (e) a component selected from the group consisting of elastomer solvents, emulsifiers, plasticizers, fillers, and mixtures thereof, present in an amount to bring the total amount of gum base to 100%, and (2) admixing the ingredients in step (1) to form a uniform mixture.

In another preferred embodiment, the invention is directed to a method for preparing an outer shell in a center-filled chewing gum composition, wherein the outer shell is comprised of a chewing gum composition, which comprises the steps of (1) providing the following ingredients of the chewing gum composition (A) a gum base present in an amount from about 40% to about 85%, by weight of the chewing gum composition, which comprises (a) an elastomer present in an amount from about 0.5% to about 20%, by weight of the gum base, (b) a medium molecular weight polyvinyl acetate polymer having a molecular weight from about 35,000 to about 55,000 present in an amount from about 10% to about 25%, by weight of the gum base, (c) an acetylated monoglyceride present in an amount from about 4.5% to about 10%, by weight of the gum base, (d) a wax having a melting point below about 60° C. present in an amount from about 6 to about 10%, by weight of the gum base, and (e) a material selected from the group consisting of elastomer solvents, emulsifiers, plasticizers, fillers, and mixtures thereof, present in an amount to bring the total amount of gum base to 100%, by weight of the gum base, and (B) a bulking agent present in an amount up to about 60%, by weight of the chewing gum composition, (2) admixing the ingredients in step (A) to form a uniform mixture, and (3) admixing the ingredients in step (B) to the mixture of step (2) to form a uniform mixture.

In accord with the present invention, the gum base and chewing gum compositions incorporating the inventive gum base may be used as the outer shell of a center-filled chewing gum enclosing a liquid center. The liquid center employed in this invention may be any liquid center well known in the art, including sugar and sugarless liquid centers. These liquid centers include, without limitation, substantially aqueous centers, aqueous centers containing additives such as thickeners, emulsifiers, humectants, binders, gums, and the like, and mixtures thereof to prevent migration of the liquid center, suspensions, and semi-liquid centers, wherein the viscosity of the liquid center can range from a gel-like consistency or pasty quality, to a relatively thixotropic, sticky liquid quality.

The liquid centers may contain those traditional ingredients well known in the chewing gum and confectionery arts such as flavoring agents, sweetening agents, and the like, and mixtures thereof. In addition to confectionery additives, the liquid centers may also contain pharmaceutical additives such as medicaments, breath fresheners, vitamins, fruit juices, and the like, and mixtures thereof. The confectionery and pharmaceutical agents may be used in many distinct physical forms well known in the art to provide an initial burst of sweetness and flavor and/or therapeutic activity or a prolonged sensation of sweetness and flavor and/or therapeutic activity. Without being limited thereto, such physical forms include free forms, such as spray dried, powdered, and beaded forms, and encapsulated forms, and mixtures thereof. Illustrative, but not limiting, examples of liquid centers suitable for use in the present invention include those centers disclosed in U.S. Pat. Nos. 3,894,154, 4,156,740, 4,157,402, 4,316,915, and 4,466,983, which disclosures are incorporated herein by reference.

Because of the increased hydrophobic properties of the outer shell in the present invention which retard migration of the liquid center, a significantly higher ratio of liquid center to solid outer shell may be incorporated into the center-filled chewing gums of this invention. The smaller amount of solid outer shell in the center-filled chewing gum product enables the preparation of reduced-calorie chewing gums. In general, the liquid center will be present in the center-filled chewing gum in an amount from about 15% to about 50%, and preferably from about 20% to about 35%, by weight of the final chewing gum product.

The present invention extends to methods of making the improved center-filled chewing gum compositions. The improved compositions may be prepared using standard techniques and equipment known to those skilled in the art. The apparatus useful in accordance with the present invention comprises mixing and heating apparatus well known in the chewing gum manufacturing arts, and therefore the selection of the specific apparatus will be apparent to the artisan Such methods and apparatus are disclosed, for example, in U.S. Pat. Nos. 3,806,290 and 3,857,963, which disclosures are incorporated herein by reference Typically, the gum base of this invention, or a chewing gum composition incorporating the gum base of this invention, is fed into a gum extruder and extruded through an orifice as a hollow-centered rope of chewing gum. A liquid center formulation is fed, under pressure, through an inner conduit to the hollow-center of the rope downstream of the orifice and the center-filled rope of chewing gum is passed into a sizing unit where rollers decrease the cross sectional dimension of the rope gum and form individual gum units.

In a preferred embodiment, the invention is directed to a method for preparing a center-filled chewing gum composition which comprises enclosing a cavity containing a liquid center with an outer shell, wherein the outer shell comprises a gum base comprising in percentages by weight (a) an elastomer present in an amount from about 0.5% to about 20%, (b) a medium molecular weight polyvinyl acetate polymer having a molecular weight from about 35,000 to about 55,000 present in an amount from about 10% to about 25%, (c) an acetylated monoglyceride present in an amount from about 4.5% to about 10%, (d) a wax having a melting point below about 60° C. present in an amount from about 6 to about 10%, and (e) a component selected from the group consisting of elastomer solvents, emulsifiers, plasticizers, fillers, and mixtures thereof, present in an amount to bring the total amount of gum base to 100%.

In another preferred embodiment, the invention is directed to a method for preparing a center-filled chewing gum composition which comprises enclosing a cavity containing a liquid center with an outer shell, wherein the outer shell comprises a chewing gum composition comprising (A) a gum base present in an amount from about 40% to about 85%, by weight of the chewing gum composition, which comprises (a) an elastomer present in an amount from about 0.5% to about 20%, by weight of the gum base, (b) a medium molecular weight polyvinyl acetate polymer having a molecular weight from about 35,000 to about 55,000 present in an amount from about 10% to about 25%, by weight of the gum base, (c) an acetylated monoglyceride present in an amount from about 4.5% to about 10%, by weight of the gum base, (d) a wax having a melting point below about 60° C. present in an amount from about 6 to about 10%, by weight of the gum base, and (e) a material selected from the group consisting of elastomer solvents, emulsifiers, plasticizers, fillers, and mixtures thereof, present in an amount to bring the total amount of gum base to 100%, by weight of the gum base, and (B) a bulking agent present in an amount up to about 60%, by weight of the chewing gum composition.

The present invention is further illustrated by the following examples which are not intended to limit the effective scope of the claims. All parts and percentages in the examples and throughout the specification and claims are by weight of the final composition unless otherwise specified.

EXAMPLES 1-7

Noninventive Runs 1-2

Inventive Runs 3-7

These examples demonstrate a comparison between conventional center-filled chewing gum compositions and center-filled chewing gum compositions prepared according to the present invention having improved stability during storage. The gum base composition of examples 1-2 (controls) and examples 3-7 (test samples) are set out in Table 1.

TABLE 1

| GUM BASE COMPOSITION (Percent By Weight) | | |
| --- | --- | --- |
| Example Ingredient | 1-2 (Controls) | 3-7 (Test Samples) |
| Elastomer | 12 | 10 |
| Polyvinyl acetate | | |
| low molecular weight | 20 | 12 |
| medium molecular weight | — | 12 |
| Acetylated monoglyceride | — | 6.5 |
| Wax | 19 | 9 |
| Glyceryl ester of partially hydrogenated wood resin | 26 | 8 |

TABLE 1-continued

| GUM BASE COMPOSITION (Percent By Weight) | | |
|---|---|---|
| Example Ingredient | 1-2 (Controls) | 3-7 (Test Samples) |
| Partially hydrogenated vegetable oil/animal fat | 5 | 9 |
| Emulsifier | 7 | 8 |
| Filler | 11 | 25.5 |

The chewing gum compositions of examples 1-2 (controls) and examples 3-7 (test samples) are set out in Table 2.

TABLE 2

| CHEWING GUM COMPOSITION (Percentages By Weight) | | | | | | | |
|---|---|---|---|---|---|---|---|
| Example Ingredient | 1 (Controls) | 2 | 3 | 4 | 5 (Test Samples) | 6 | 7 |
| Gum Base | 28.0 | 28.0 | 65.0 | 65.0 | 65.0 | 65.0 | 65.0 |
| Carbohydrates | | | | | | | |
| Sugarless | 52.3 | | 27.45 | 27.45 | | | |
| Sugar | | 52.3 | | | | 27.45 | |
| Sugarless with Xylitol | | | | | 27.45 | | |
| Fructose | | | | | | | 27.45 |
| Softening agent | 18.0 | 18.0 | 5.1 | 5.1 | 5.1 | 5.1 | 5.1 |
| Flavoring agent | | | | | | | |
| Peppermint | 1.35 | 1.35 | 2.0 | | 2.0 | 2.0 | 2.0 |
| Trident | | | | 2.0 | | | |
| Sweetening agent | 0.35 | 0.35 | 0.45 | 0.45 | 0.45 | 0.45 | 0.45 |

Center-filled chewing gum compositions were prepared incorporating the liquid centers set out in Table 3 and containing the gum base compositions set out in Table 1 and the chewing gum compositions set out in Table 2.

TABLE 3

| LIQUID CENTER COMPOSITION (Percentages By Weight) | | |
|---|---|---|
| Example | | Ingredients |
| 1 (Control) | 69% | Sugarless Humectants and Thickeners |
| | 1% | Flavoring Agent |
| | 30% | Water |
| 2 (Control) | 59% | Sugar Humectants and Thickeners |
| | 1% | Flavoring Agent |
| | 40% | Water |
| 3 | 100% | Lycasin |
| 4 | 100% | Glyderin |
| 5 | 100% | Water |
| 6 | 69% | Sugarless Humectants and Thickeners |
| | 1% | Flavoring Agent |
| | 30% | Water |
| 7 | 97% | Glycerin |
| | 3% | Flavoring Agent |

The weight ratio of liquid center to outer shell in the center-filled chewing gum compositions of example 1-2 (controls) was about 20% and the weight ratio of liquid center to outer shell in the center-filled chewing gum compositions of examples 3-7 (test samples) was about 30%. The center-filled chewing gum compositions of examples 1-7 were stored at 37° C. and observed periodically for stability.

At the end of one week, the centers in all the center-filled chewing gum compositions were stable. At the end of two weeks, the centers in the chewing gum compositions were satisfactory, however, the centers in the chewing gums of examples 1 and 2 (controls) and in example 5 (water center-test sample) were becoming thick. At the end of four weeks, the centers in the chewing gums of examples 1 and 2 (controls) had dried out, the center in example 5 (water center-test sample) was thick, and the centers in the chewing gum compositions of examples 4, 6 and 7 (test samples) were acceptable. At the end of seven weeks, the centers in the chewing gum compositions of examples 3-7 (test samples) showed no further change. At the end of eight weeks, the centers in the chewing gum compositions of examples 3-7 (test samples) still had an acceptable squirt center, even the center in example 5 (water center-test sample) which had become a thick tacky mass. At the end of twelve weeks, the centers in the chewing gum compositions of examples 3-7 (test samples) still had an acceptable squirt center, including the center in the chewing gum of example 5 (water center-test sample).

Accordingly, the center-filled chewing gum compositions of examples 3-7, which contained the inventive gum base composition, were much more stable during storage than the control compositions of examples 1-2.

The amount of moisture absorbed by the chewing gum compositions of examples 1-2 (control) and 3-7 (test samples) was measured over a period of six weeks at a temperature of 27° C. and a relative humidity (RH) of 80%. The amount of moisture absorbed by each gum composition, in percentage moisture absorbed by weight versus weeks of storage, is set out in FIG. 1. FIG. 1 shows that the chewing gum compositions of examples 3-7, which contained the inventive gum base, absorbed significantly less moisture than the conventional chewing gum compositions of examples 1-2.

EXAMPLES 8-11

These examples demonstrate a comparison between center-filled chewing gum compositions containing different levels of the gum base of the present invention. The composition of the gum base is that set out above for examples 3-7. The chewing gum compositions of examples 8-11 are set out in Table 4.

TABLE 4

| CHEWING GUM COMPOSITION (Percentages By Weight) | | | | |
|---|---|---|---|---|
| | EXAMPLE | | | |
| Ingredient | 8 | 9 | 10 | 11 |
| Gum Base | 23 | 26 | 65 | 85 |
| Carbohydrates | 72.55 | 69.55 | 27.45 | 7.45 |
| Softening agent | 19 | 18 | 5.1 | 5.1 |
| Flavoring agent | 2 | 2 | 2 | 2 |
| Sweetening agent | 0.45 | 0.45 | 0.45 | 0.45 |

Center-filled chewing gum compositions were prepared from each chewing gum composition set out in Table 4 (examples 8-11) incorporating each of the liquid centers (examples A-C) set out in Table 5.

TABLE 5

| LIQUID CENTER COMPOSITION (Percentages By Weight) | | |
|---|---|---|
| Example | | Ingredients |
| A | 69% | Sugarless humectants and thickeners |
| | 1% | Flavoring agent |
| | 30% | Water |
| B | 100% | Sorbitol Solution |
| C | 100% | Water |

The weight ratio of liquid center to outer shell in the center-filled chewing gum compositions of examples 8-11 was about 30%. The center-filled chewing gum compositions were stored at 37° C. and observed periodically for stability.

At the end of one hour, the center in the gum composition of example 8C (water center-23% gum base) started to migrate. At the end of two hours, the center in the gum composition of example 9C (water center-26% gum base) also started to migrate. At the end of four hours, the center of example 8C (water center-23% gum base) disappeared, the center of example 9C (water center-26% gum base) was almost gone, and the center of example 8B (sorbitol solution center-23% gum base) started to migrate.

At the end of five days, the center of example 9C (water center-26% gum base) had migrated, the centers of examples 9B and 10B (sorbitol solution center-26% gum base and 65% gum base) had started to migrate, the center of example 10C (water center-65% gum base) had started to migrate, and the centers of examples 11B and 11C (sorbitol solution center and water center, respectively-85% gum base) were still acceptable. The centers of examples 8A, 9A, 10A and 11A (69% sugarless humectants and thickeners, 1% flavoring agent and 30% water center) had started to migrate with the center of example 8A (23% gum base) showing greatest migration and the center of example 11A (85% gum base) showing least migration.

At the end of eleven days, only the centers of examples 8A, 9A, 10A and 11A (69% sugarless humectants and thickeners, 1% flavoring agent and 30% water center) were acceptable with the center of example 8A (23% gum base) being very tacky and the center of example 11A (85% gum base) showing only slight migration.

In the remaining samples, an aliquot of the center of the sample was taken and the percent solids of the center was measured using a Bausch & Lomb refractometer. The centers were prepared with an initial percent solids of 72%. As the centers migrate, the percent solids increase.

At the end of one month, the center of example 8A (69% sugarless humectants and thickeners, 1% flavoring agent and 30% water center-23% gum base) was very thick and had a percent solids of 82%. The center of example 11A (69% sugarless humectants and thickeners, 1% flavoring agent and 30% water center-85% gum base) was still fluid and had a percent solids of 72%.

At the end of two months, the center of example 8A (69% sugarless humectants and thickeners, 1% flavoring agent and 30% water center-23% gum base) had migrated significantly and an aliquot could not be taken for analysis of percent solids. The center of example 11A (69% sugarless humectants and thickeners, 1% flavoring agent and 30% water center-85% gum base) was still fluid and had a percent solids of 72%.

At the end of three months, the centers of examples 10A and 11A (69% sugarless humectants and thickeners, 1% flavoring agent and 30% water center-65% gum base and 85% gum base, respectively) were still fluid and each had a percent solids of 74%.

Accordingly, the center-filled chewing gum compositions of examples 10 and 11, which contained higher amounts of the inventive gum base composition (65% and 85%, respectively), were much more stable during storage than the gum compositions of examples 8 and 9 which contained smaller amounts of the gum base (23% and 26%, respectively).

The invention being thus described, it will be obvious that the same may be varied in many ways. Such variations are not to be regarded as a departure from the spirit and scope of the invention and all such modifications are intended to be included within the scope of the following claims

We claim:
1. A center-filled chewing gum composition having an outer shell enclosing a cavity and a liquid center within the cavity, wherein the outer shell comprises a gum base comprising in percentages by weight of the gum base:
   (a) an elastomer present in an amount from about 0.5% to about 20%;
   (b) a medium molecular weight polyvinyl acetate polymer having a molecular weight from about 35,000 to about 55,000 present in an amount from about 10% to about 25%;
   (c) an acetylated monoglyceride present in an amount from about 4.5% to about 10%;
   (d) a wax having a melting point below about 60° C. present in an amount from about 6% to about 10%; and
   (e) a component selected from the group consisting of elastomer solvents, emulsifiers, plasticizers, fillers, and mixtures thereof, present in an amount to bring the total amount of gum base to 100%.

2. The center-filled chewing gum composition according to claim 1, wherein the elastomer is selected from the group consisting of natural gums, synthetic gums, and mixtures thereof.

3. The center-filled chewing gum composition according to claim 1, wherein the elastomer is present in an amount from about 2.5% to about 15%, by weight of the gum base.

4. The center-filled chewing gum composition according to claim 1, wherein the polyvinyl acetate polymer is present in amount from about 12% to about 17%, by weight of the gum base.

5. The center-filled chewing gum composition according to claim 1, further comprising a low molecular weight polyvinyl acetate polymer having a molecular weight from about 12,000 to about 16,000 present in an amount up to about 17%, by weight of the gum base.

6. The center-filled chewing gum composition according to claim 5, wherein the low molecular weight polyvinyl acetate polymer is present in an amount from about 12% to about 17%, by weight of the gum base.

7. The center-filled chewing gum composition according to claim 5, wherein the mole ratio of low molecular weight polyvinyl acetate polymer to medium molecular weight polyvinyl acetate polymer is from about 1:0.5 to about 1:1.5, respectively.

8. The center-filled chewing gum composition according to claim 1, wherein the acetylated monoglyceride has a saponification value above about 400.

9. The center-filled chewing gum composition according to claim 1, wherein the acetylated monoglyceride is present in an amount from about 5% to about 9%, by weight of the gum base.

10. The center-filled chewing gum composition according to claim 1, wherein the wax is a paraffin wax having a melting point between about 45° C. and about 55° C.

11. The center-filled chewing gum composition according to claim 1, wherein the wax is present in an amount from about 7% to about 9.5%, by weight of the gum base.

12. The center-filled chewing gum composition according to claim 1, wherein the elastomer solvent is present and is selected from the group consisting of the pentaerythritol ester of partially hydrogenated wood and gum rosin, the pentaerythritol ester of wood and gum rosin, the glycerol ester of wood rosin, the glycerol ester of partially dimerized wood and gum rosin, the glycerol ester of polymerized wood and gum rosin, the glycerol ester of tall oil rosin, the glycerol ester of wood and gum rosin and the partially hydrogenated wood and gum rosin and the partially hydrogenated methyl ester of wood and rosin, and mixtures thereof.

13. The center-filled chewing gum composition according to claim 1, wherein the elastomer solvent is present in an amount from about 2% to about 12%, by weight of the gum base.

14. The center-filled chewing gum composition according to claim 1, wherein the plasticizer is present and is a hydrogenated vegetable oil selected from the group consisting of soybean oil, cotton seed oil, and mixtures thereof.

15. The center-filled chewing gum composition according to claim 1, wherein the plasticizer is present in an amount from about 5% to about 13%, by weight of the gum base.

16. The center-filled chewing gum composition according to claim 1, wherein the filler is present in an amount from about 15% to about 40%, by weight of the gum base.

17. The center-filled chewing gum composition according to claim 1, wherein the liquid center is present in an amount from about 15% to about 50%, by weight of the gum composition.

18. A center-filled chewing gum composition having an outer shell enclosing a cavity and a liquid center within the cavity, wherein the outer shell comprises a gum base comprising in percentages by weight of the gum base:
  (a) an elastomer present in an amount from about 0.5% to about 20%;
  (b) a medium molecular weight polyvinyl acetate polymer having a molecular weight from about 35,000 to about 55,000 present in an amount from about 10% to about 25%;
  (c) an acetylated monoglyceride present in an amount from about 4.5% to about 10%;
  (d) a wax having a melting point below about 60° C. present in an amount from about 6% to about 10%;
  (e) an elastomer solvent present in an amount from about 2% to about 11%;
  (f) a plasticizer in an amount from about 5% to about 14%; and
  (g) a filler in an amount from about 15% to about 40%.

19. A center-filled chewing gum composition having an outer shell enclosing a cavity and a liquid center within the cavity, wherein the outer shell comprises a chewing gum composition comprising:
  (A) a gum base present in an amount from about 40% to about 85%, by weight of the chewing gum composition, which comprises:
    (a) an elastomer present in an amount from about 0.5% to about 20%, by weight of the gum base;
    (b) a medium molecular weight polyvinyl acetate polymer having a molecular weight from about 35,000 to about 55,000 present in an amount from about 10% to about 25%, by weight of the gum base;
    (c) an acetylated monoglyceride present in an amount from about 4.5% to about 10%, by weight of the gum base;
    (d) a wax having a melting point below about 60° C. present in an amount from about 6% to about 10%, by weight of the gum base; and
    (e) a material selected from the group consisting of elastomer solvents, emulsifiers, plasticizers, fillers, and mixtures thereof, present in an amount to bring the total amount of gum base to 100%, by weight of the gum base; and
  (B) a bulking agent present in an amount up to about 60%, by weight of the chewing gum composition.

20. The center-filled chewing gum composition according to claim 19, wherein the elastomer is selected from the group consisting of natural gums, synthetic gums, and mixtures thereof.

21. The center-filled chewing gum composition according to claim 19, wherein the elastomer is present in an amount from about 2.5% to about 15%, by weight of the gum base.

22. The center-filled chewing gum composition according to claim 19, wherein the polyvinyl acetate polymer is present in amount from about 12% to about 17%, by weight of the gum base.

23. The center-filled chewing gum composition according to claim 19, further comprising a low molecular weight polyvinyl acetate polymer having a molecular weight from about 12,000 to about 16,000 present in an amount up to about 17%, by weight of the gum base.

24. The center-filled chewing gum composition according to claim 23, wherein the low molecular weight polyvinyl acetate polymer is present in an amount from about 12% to about 17%, by weight of the gum base.

25. The center-filled chewing gum composition according to claim 23, wherein the mole ratio of low molecular weight polyvinyl acetate polymer to medium molecular weight polyvinyl acetate polymer is from about 1:0.5 to about 1:1.5, respectively.

26. The center-filled chewing gum composition according to claim 19, wherein the acetylated monoglyceride has a saponification value above about 400.

27. The center-filled chewing gum composition according to claim 19, wherein the acetylated monoglyceride is present in an amount from about 5% to about 9%, by weight of the gum base.

28. The center-filled chewing gum composition according to claim 19, wherein the wax is a paraffin wax having a melting point between about 45° C. and about 55° C.

29. The center-filled chewing gum composition according to claim 19, wherein the wax is present in an amount from about 7% to about 9.5%, by weight of the gum base.

30. The center-filled chewing gum composition according to claim 19, wherein the elastomer solvent is present and is selected from the group consisting of the pentaerythritol ester of partially hydrogenated wood and gum rosin, the pentaerythritol ester of wood and gum rosin, the glycerol ester of wood rosin, the glycerol ester of partially dimerized wood and gum rosin, the glycerol ester of polymerized wood and gum rosin, the glycerol ester of tall oil rosin, the glycerol ester of wood and gum rosin and the partially hydrogenated wood and gum rosin and the partially hydrogenated methyl ester of wood and rosin, and mixtures thereof.

31. The center-filled chewing gum composition according to claim 19, wherein the elastomer solvent is present in an amount from about 2% to about 12%, by weight of the gum base.

32. The center-filled chewing gum composition according to claim 19, wherein the plasticizer is present and is a hydrogenated vegetable oil selected from the group consisting of soybean oil, cotton seed oil, and mixtures thereof 33. The center-filled chewing gum composition according to claim 19, wherein the plasticizer is present in an amount from about 5% to about 13%, by weight of the gum base.

34. The center-filled chewing gum composition according to claim 19, wherein the filler is present in an amount from about 15% to about 40%, by weight of the gum base.

35. The center-filled chewing gum composition according to claim 19, wherein the liquid center is present in an amount from about 15% to about 50%, by weight of the gum composition.

36. The center-filled chewing gum composition according to claim 19, wherein the bulking agent is present in an amount from about 15% to about 60%, by weight of the gum composition.

37. A center-filled chewing gum composition having an outer shell enclosing a cavity and a liquid center within the cavity, wherein the outer shell comprises a chewing gum composition comprising:
(A) a gum base present in an amount from about 40% to about 85%, by weight of the chewing gum composition, which comprises:
  (a) an elastomer present in an amount from about 0.5% to about 20%, by weight of the gum base;
  (b) a medium molecular weight polyvinyl acetate polymer having a molecular weight from about 35,000 to about 55,000 present in an amount from about 10% to about 25%, by weight of the gum base;
  (c) an acetylated monoglyceride present in an amount from about 4.5% to about 10%, by weight of the gum base;
  (d) a wax having a melting point below about 60° C. present in an amount from about 6% to about by weight of the gum base;
  (e) an elastomer solvent present in an amount from about 2% to about 11%, by weight of the gum base;
  (f) a plasticizer in an amount from about to about 14%, by weight of the gum base; and
  (g) a filler in an amount from about 15% to about 40%, by weight of the gum base; and
(B) a bulking agent present in an amount up to about 60%, by weight of the chewing gum composition.

38. A method for preparing an outer shell in a center-filled chewing gum composition, wherein the outer shell is comprised of a gum base, which comprises the steps of:
(1) providing the following ingredients in percentages by weight of the gum base:
  (a) an elastomer present in an amount from about 0.5% to about 20%;
  (b) a medium molecular weight polyvinyl acetate polymer having a molecular weight from about 35,000 to about 55,000 present in an amount from about 10% to about 25%;
  (c) an acetylated monoglyceride present in an amount from about 4.5% to about 10%;
  (d) a wax having a melting point below about 60° C. present in an amount from about 6% to about 10%; and
  (e) a component selected from the group consisting of elastomer solvents, emulsifiers, plasticizers, fillers, and mixtures thereof, present in an amount to bring the total amount of gum base to 100%; and
(2) admixing the ingredients in step (1) to form a uniform mixture.

39. A method for preparing an outer shell in a center-filled chewing gum composition, wherein the outer shell is comprised of a chewing gum composition, which comprises the steps of:
(1) providing the following ingredients of the chewing gum composition:
  (A) a gum base present in an amount from about 40% to about 85%, by weight of the chewing gum composition, which comprises
    (a) an elastomer present in an amount from about 0.5% to about 20%, by weight of the gum base;
    (b) a medium molecular weight polyvinyl acetate polymer having a molecular weight from about 35,000 to about 55,000 present in an amount from about 10% to about 25%, by weight of the gum base;
    (c) an acetylated monoglyceride present in an amount from about 4 5% to about 10%, by weight of the gum base;
    (d) a wax having a melting point below about 60° C. present in an amount from about 6% to about 10%, by weight of the gum base; and
    (e) a material selected from the group consisting of elastomer solvents, emulsifiers, plasticizers, fillers, and mixtures thereof, present in an amount to bring the total amount of gum base to 100%, by weight of the gum base; and
  (B) a bulking agent present in an amount up to about 60%, by weight of the chewing gum composition;
(2) admixing the ingredients in step (A) to form a uniform mixture; and
(3) admixing the ingredients in step (B) to the mixture of step (2) to form a uniform mixture.

40. A method for preparing a center-filled chewing gum composition which comprises enclosing a cavity containing a liquid center with an outer shell, wherein the outer shell comprises a gum base comprising in percentages by weight of the gum base:
(a) an elastomer present in an amount from about 0.5% to about 20%;
(b) a medium molecular weight polyvinyl acetate polymer having a molecular weight from about 35,000 to about 55,000 present in an amount from about 10% to about 25%;
(c) an acetylated monoglyceride present in an amount from about 4.5% to about 10%;
(d) a wax having a melting point below about 60° C. present in an amount from about 6% to about 10%; and
(e) a component selected from the group consisting of elastomer solvents, emulsifiers, plasticizers, fillers, and mixtures thereof, present in an amount to bring the total amount of gum base to 100%.

41. A method for preparing a center-filled chewing gum composition which comprises enclosing a cavity containing a liquid center with an outer shell, wherein the outer shell comprises a chewing gum composition comprising:

(A) a gum base present in an amount from about 40% to about 85%, by weight of the chewing gum composition, which comprises:
 (a) an elastomer present in an amount from about 0.5% to about 20%, by weight of the gum base;
 (b) a medium molecular weight polyvinyl acetate polymer having a molecular weight from about 35,000 to about 55,000 present in an amount from about 10% to about 25%, by weight of the gum base;
 (c) an acetylated monoglyceride present in an amount from about 4.5% to about 10%, by weight of the gum base;
 (d) a wax having a melting point below about 60° C. present in an amount from about 6% to about 10%, by weight of the gum base; and
 (e) a material selected from the group consisting of elastomer solvents, emulsifiers, plasticizers, fillers, and mixtures thereof, present in an amount to bring the total amount of gum base to 100%, by weight of the gum base; and
(B) a bulking agent present in an amount up to about 60%, by weight of the chewing gum composition.

42. A center-filled chewing gum composition having an outer shell enclosing a cavity and a liquid center within the cavity, wherein the outer shell comprises a gum base having an enhanced hydrophilic nature.

43. The center-filled chewing gum composition according to claim 42, wherein the liquid center is present in an amount from about 15% to about 50%, by weight of the gum composition.

44. A center-filled chewing gum composition having an outer shell enclosing a cavity and a liquid center within the cavity, wherein the outer shell comprises a chewing gum composition comprising:
 (A) a gum base having an enhanced hydrophilic nature present in an amount from about 40% to about 85%, by weight of the chewing gum composition; and
 (B) a bulking agent present in an amount up to about 60%, by weight of the chewing gum composition.

45. The center-filled chewing gum composition according to claim 44, wherein the liquid center is present in an amount from about 15% to about 50%, by weight of the gum composition.

46. The center-filled chewing gum composition according to claim 44, wherein the bulking agent is present in an amount from about 15% to about 60%, by weight of the gum composition.

47. A method for preparing an outer shell in a center-filled chewing gum composition, wherein the outer shell is comprised of a gum base having an enhanced hydrophilic nature, which comprises the steps of:
 (1) providing the ingredients of the gum base having an enhanced hydrophilic nature, and
 (2) admixing the ingredients in step (1) to form a uniform mixture.

48. A method for preparing an outer shell in a center-filled chewing gum composition, wherein the outer shell is comprised of a chewing gum composition, which comprises the steps of:
 (1) providing the following ingredients of the chewing gum composition:
  (A) a gum base having an enhanced hydrophilic nature present in an amount from about 40% to about 85%, by weight of the chewing gum composition; and
  (B) a bulking agent present in an amount up to about 60%, by weight of the chewing gum composition;
 (2) admixing the ingredients in step (A) to form a uniform mixture; and
 (3) admixing the ingredients in step (B) to the mixture of step (2) to form a uniform mixture.

49. A method for preparing a center-filled chewing gum composition which comprises enclosing a cavity containing a liquid center with an outer shell, wherein the outer shell comprises a gum base having an enhanced hydrophilic nature.

50. A method for preparing a center-filled chewing gum composition which comprises enclosing a cavity containing a liquid center with an outer shell, wherein the outer shell comprises a chewing gum composition comprising:
 (A) a gum base having an enhanced hydrophilic nature present in an amount from about 40% to about 85%, by weight of the chewing gum composition; and
 (B) a bulking agent present in an amount up to about 60%, by weight of the chewing gum composition.

* * * * *